United States Patent [19]
Sutton, Jr. et al.

[11] Patent Number: 5,939,498
[45] Date of Patent: Aug. 17, 1999

[54] HIGH MODULUS POLYIMIDE BLEND

[75] Inventors: Richard Frederich Sutton, Jr., Circleville; Darrel Eugene Coverdell, Amanda, both of Ohio

[73] Assignee: E. I. du Pont de Nemours and Company, Wilmington, Del.

[21] Appl. No.: 09/056,110

[22] Filed: Apr. 7, 1998

[51] Int. Cl.⁶ .................................................. C08L 77/00
[52] U.S. Cl. .......................... 525/432; 528/350; 528/351; 528/353; 525/420; 525/540; 264/211.12; 264/330; 264/331.11
[58] Field of Search ..................................... 528/350, 351, 528/353; 525/420, 432, 540; 264/211.12, 330, 331.11

[56] References Cited

FOREIGN PATENT DOCUMENTS 1-110535  4/1989  Japan .
6-55843   7/1994  Japan .

*Primary Examiner*—Samuel A. Acquah

[57] ABSTRACT

An intimate polyimide blend, prepared by chemical conversion, containing from 25 to 50 weight % of a first polyimide derived from 90 to 100 mole % of 3,3', 4,4'-biphenyltetracarboxylic dianhydride, 0 to 10 mole % of pyromellitic dianhydride and p-phenylenediamine and from 50 to 75 weight % of a second polyimide derived from pyromellitic dianhydride, from 20 to 50 mole % of p-phenylenediamine and from 50 to 80 mole % of 4,4'-diaminodiphenylether. The polyimide blend provides blister free films having high modulus and low thermal expansion coefficients for use in electronics applications.

14 Claims, No Drawings

HIGH MODULUS POLYIMIDE BLEND

BACKGROUND OF THE INVENTION

This invention is directed to polyimide blend polymers and films and to a process for their preparation.

Aromatic polyimide films are widely used in microelectronics fabrication, in devices and packaging, and as dielectric barriers owing to their excellent thermal, mechanical and electrical properties. Many polyimide films have been prepared by structural variation of the aromatic tetracarboxylic acid anhydride component and even more structurally variable aromatic diamine component. Some combinations of aromatic tetracarboxylic acid anhydrides and aromatic diamines exhibit properties useful in a wide range of applications. However, only a few polyimide films have been produced in commercial quantities. It is generally the rule that if a specific polyimide film exhibits a significant improvement in one property, it does so at the expense of some other property.

The properties of polyimide films can be altered by copolymerizing different sets of tetracarboxylic acid anhydrides and diamines or multiples of them. However, this route can be impractical due to higher cost, chemical complexity and slower film production throughput.

For example, U.S. Pat. No. 5,166,308, issued on Nov. 24, 1992, discloses an aromatic copolyimide film for use as an advanced electronic substrate prepared by chemical conversion of a copolyamic acid solution obtained by copolymerization of pyromellitic dianhydride (PMDA), 3,3',4,4'-biphenyltetracarboxylic dianhydride (BPDA), 4,4'-diaminodiphenylether (DADE) and p-phenylenediamine (PPD). The aromatic copolyimide film advantageously has a low coefficient of thermal and hygroscopic expansion, low water absorption and high mechanical strength. However, during manufacture the copolyimide film exhibits undesirable blister formation during drying and curing, which severely limits production throughput.

An alternative approach, which involves blending of independently prepared polyimides, can sometimes be used to tailor properties of the polyimide film for a specific application. Unfortunately, polyimides, like most polymers, are generally immiscible with each other. When dissolved in a suitable mutual solvent, the blended polyimides tend to phase separate when dried rapidly thereby forming a hazy, coarse surfaced polyimide film, which is undesirable for electronics applications.

For example, Japanese patent publication 01-110535, published Apr. 27, 1989, and Japanese patent publication 6-55843, published Jul. 27, 1994, disclose surface roughened polyimide films prepared by blending two different aromatic polyamic acids specifically derived from biphenyltetracarboxylic dianhydride (BPDA) and p-phenylenediamine (PPD) and pyromellitic dianhydride (PMDA) and 4,4'-diaminodiphenyl ether (DADE) and an imidization agent in a polar organic solvent, forming a film and then drawing and heat treating the film at a high temperature. The resulting polyimide blend film, however, has a rough, bark-like surface due to partial phase separation of the polyimide blend components during drying and curing.

Thus, a need exists for a polyimide blend film which has low water absorption, low coefficients of thermal and hygroscopic expansion and high mechanical strength and does not contain undesirable blisters or surface roughness due to phase separation of the polyimide blend components.

SUMMARY OF THE INVENTION

The present invention relates to an intimate polyimide blend comprising (a) from 25 to 50 weight %, based on the total weight of the blend, of a first polyimide comprising from 90 to 100 mole % of 3,3'4,4'-biphenyltetracarboxylic dianhydride, from 0 to 10 mole % of pyromellitic dianhydride and p-phenylenediamine and (b) from 50 to 75 weight %, based on the total weight of the blend, of a second polyimide comprising pyromellitic dianhydride and from 20 to 50 mole % of p-phenylenediamine and from 50 to 80 mole % of 4,4'-diaminodiphenylether.

The present invention further relates to a process for preparing an intimate polyimide blend film comprising the steps of:

(1) admixing, at a temperature below which imidization does not substantially occur and for a time sufficient to form an intimate blend,
 (a) from 25 to 50 weight %, based on the total weight of the polyamic acid polymers, of a first polyamic acid polymer comprising from 90 to 100 mole % of 3,3'4,4'-biphenyltetra-carboxylic dianhydride, from 0 to 10 mole % of pyromellitic dianhydride and p-phenylenediamine dissolved in a polar organic solvent, and
 (b) from 50 to 75 weight %, based on the total weight of the polyamic acid polymers, of a second polyamic acid polymer comprising pyromellitic dianhydride and from 20 to 50 mole % of p-phenylenediamine and from 50 to 80 mole % of 4,4'-diaminodiphenylether dissolved in a polar organic solvent;

(2) mixing the blend of polyamic acid polymers (a) and (b) with conversion chemicals to chemically convert the polyamic acids to the polyimides;

(3) forming a gel film of the blend of polyamic acid polymers (a) and (b) and conversion chemicals; and (4) heating the polyamic acid polymer blend gel film to a sufficient temperature and for a sufficient time to completely convert the polyamic acids to the polyimides.

DETAILED DESCRIPTION OF THE INVENTION

In accordance with the present invention, the individual polyamic acid polymer corresponding to the first essential component (a), i.e. the polyamic acid of from 90 to 100 mole % of 3,3'4,4'-biphenyltetracarboxylic dianhydride (BPDA), from 0 to 10 mole % of pyromellic dianhydride and p-phenylenediamine (PPD) and the individual polyamic acid polymer corresponding to the second essential component (b), i.e. the polyamic acid of pyromellitic dianhydride (PMDA), from 20 to 50 mole % of p-phenylenediamine (PPD) and from 50 to 80 mole % of 4,4'-diaminodiphenyl ether (DADE), are separately prepared by well-known procedures involving reaction of the selected tetracarboxylic dianhydride and diamine or diamines, in an inert organic polar solvent, preferably under anhydrous conditions, for a time and at a temperature sufficient to provide individual solutions of polyamic acid polymers (a) and (b).

The organic polar solvents used in the invention are any solvents which uniformly dissolve the first and second polyamic acid polymers and, preferably, the polyamic acid polymerization product and include N,N-di-lower alkylcarboxylamides, such as N,N-dimethylacetamide, N,N-diethylacetamide, N,N-dimethylformamide, N,N-diethylformamide, N-methyl-2-pyrrolidone, dimethylsulfoxide, diethylsulfoxide, dimethylsulfone and diethylsulfone.

Polyamic acid polymers (a) and (b) are then intimately mixed together at a temperature below which imidization does not substantially occur, preferably below about 60° C.

The polyamic acids, before blending, have an inherent viscosity of at least 0.1, and preferably 0.3 to 5.0. The amount of the first polyamic acid polymer (a) and the second polyamic acid polymer (b) ranges from 25 to 50 weight % for polyamic acid polymer (a) and from 50 to 75 weight % for polyamic acid polymer (b), preferably, from 30 to 40 weight % of polyamic acid polymer (a) and from 60 to 70 weight % of polyamic acid polymer (b).

In the invention, 3,3',4,4'-biphenyltetracarboxylic dianhydride and/or pyromellitic dianhydride may be used in combination with other aromatic tetracarboxylic dianhydrides which can be present in an amount of not more than 10 mole %, preferably not more than 5 mole % of the total amount of the tetracarboxylic dianhydride component.

Suitable dianhydrides include: 2,3,6,7-naphthalene tetracarboxylic dianhydride; 1,2,5,6-naphthalene tetracarboxylic dianhydride; 2,2',3,3'-biphenyl tetracarboxylic dianhydride; 3,3',4,4'-benzophenone tetracarboxylic dianhydride; 2,2-bis(3,4-dicarboxyphenyl) propane dianhydride; 3,4,9,10-perylene tetracarboxylic dianhydride; 1,1-bis(2,3-dicarboxyphenyl) ethane dianhydride; 1,1-bis(3,4-dicarboxyphenyl) ethane dianhydride; bis(2,3-dicarboxyphenyl) methane dianhydride; bis(3,4-dicarboxyphenyl) methane dianhydride; oxydiphthalic dianhydride; bis (3,4-dicarboxyphenyl) sulfone dianhydride; and the like.

Further, p-phenylene and/or 4,4'-diaminodiphenyl ether can be used in combination with other aromatic diamines which can be present in an amount of not more than 10 mole %, preferably not more than 5 mole % of the total amount of the aromatic diamine component.

Suitable aromatic diamines include: 4,4'-diaminodiphenyl propane; 4,4'-diamino-diphenyl methane; benzidine; 3,4'-dichlorobenzidine; 4,4'-diaminodiphenyl sulfide; 3,4'-diaminodiphenyl sulfone; 4,4'-diaminodi-phenyl sulfone; 3,4'-diaminodiphenyl ether; 1,5-diaminonaphthalene; 4,4'-diaminodiphenyl diethylsilane, 4,4'-diaminodiphenylsilane; 4,4'-diaminodiphenyl ethyl phosphine oxide; 4,4'-diaminodiphenyl N-methyl amine; 4,4'-diaminodiphenyl N-phenylamine; and the like.

Polyamic acid conversion chemicals are then added to the blend of polyamic acid polymers (a) and (b) to convert the polyamic acids to the polyimides. The polyamic acid conversion chemicals are tertiary amine catalysts and anhydride dehydrating materials. The preferred anhydride dehydrating material is acetic anhydride and is used in slight molar excess of the amount of amic acid groups in the blend of polyamic acids, typically about 2 to 3 moles per equivalent of the polyamic acids. A comparable amount of tertiary amine catalyst is used. Besides acetic anhydride, other operable lower fatty acid anhydrides include propionic, butyric, valeric, mixed anhydrides of these with one another and with anhydrides of aromatic monocarboxylic acids, for example, benzoic acid, naphthoic acid, and the like, and with anhydrides of carbonic and formic acids, as well as aliphatic ketenes (ketene and dimethyl ketene). Ketenes may be regarded as anhydrides of carboxylic acids derived from drastic dehydration of the acids.

The preferred tertiary amine catalysts are pyridine and beta-picoline and they are used in an amount of about one mole per mole of anhydride dehydrating material. Tertiary amines having approximately the same activity as the preferred pyridine and beta-picoline may be used. These include 3,4-lutidine, 3,5-lutidine, 4-methyl pyridine, 4-isopropyl pyridine, N-dimethyl benzyl amine, isoquinoline, 4-benzyl pyridine and N-dimethyl dodecylamine. Trimethyl amine and triethyl amine are more active than those amines mentioned above and can be used in smaller amounts.

The polyamic acid conversion chemicals react at about room temperature or above to convert the polyamic acids to the polyimides. The chemical conversion reaction occurs at temperatures from 10° to 120° C. with the reaction being very rapid at the higher temperatures and very slow at the lower temperatures. Below about 10° C., polyamic acid chemical conversion comes to a practical halt. Therefore, the polyamic acid solution temperature should be maintained below 10° C. before adding the polyamic acid conversion chemicals and maintained at below 10° C. during film formation by extrusion or casting.

The properties of the final polyimide film made by blending the two polyamic acid polymers depends on the conversion chemistry during chemical conversion as well as on the polymer compositions. The final polyimides corresponding to the two polymers are generally mutually insoluble in each other. However, by blending the polyamic acid solutions which are soluble in each other, intimate mixing of the polymer chains can occur on a molecular level. The polymer compounds of the blend can be in contact for a short time without appreciable amide—amide interchange occurring to convert the blend into a copolymer. Up to two hours or more at ambient temperature has been found not to provide appreciable amide—amide interchange and is practical for further processing of the polyamic acid polymers to the polyimide polymers.

The polyamic acid solutions may contain additional ingredients for enhancing processing or imparting desirable properties to the final polyimide blend film, including adhesion promoters, flow agents, curing accelerators, viscosity control agents, fillers such as talc, mica, carbon black, alumina, calcium phosphates, etc. and release agents such as organic phosphites and phosphates.

The blend of polyamic acid polymers (a) and (b) and conversion chemicals is cast or extruded onto a heated conversion surface whereupon some of the organic solvent is evaporated from the solution, the polyamic acids are partially converted to the polyimides, and the solution takes the form of a self-supporting gel film. The solution as cast or extruded is maintained at about 10° C. to −10° C. The conversion surface, usually a polished metal drum, is maintained at a temperature of about 60° to 120° C. to evaporate the solvent. Conversion of amic acid groups to imide groups depends on the contact time and temperature but is usually about 25 to 95% complete. The gel film is self-supporting in spite of its high solvent content.

To complete the manufacture of the polyimide blend film, the organic solvent must be completely removed and the remaining polyamic acid must be converted to the polyimide. Preferably, high temperatures are used for short periods of time to dry the gel film and convert it to the polyimide. The film is preferably heated at a temperature of 200° C. to 450° C., most preferably from 250° C. to 440° C., for from 1 to 60 minutes, preferably from 10 to 30 minutes. of course, less heat and time are required for thin films than for thick films. During drying and converting, the film is restrained from undue shrinking and, in fact, can be stretched by as much as 40% of its initial dimensions prior to completion of the drying and conversion. Stretching can be in either the longitudinal direction or the transverse direction. If desired the restraint can also be provided to permit some limited degree of shrinkage, e.g. about 15% shrinkage provides a satisfactory product.

By rapidly converting the gel film at high temperatures, the two different polymers do not have time to phase separate as indicated by the polyimide blend having a clear and smooth appearance and a reduced tendency to form blisters.

The polyimide blend films of the invention have similar modulus and thermal expansion coefficients and exhibit less blistering than copolymers having the same approximate chemical composition. There is very little, if any, sacrifice of other important mechanical and electrical properties.

The invention will be more clearly understood by referring to the examples which follow. These examples, which illustrate specific embodiments of the present invention, should not be construed to limit the invention in any way.

EXAMPLE 1

Example 1 illustrates the preparation of a blend of BPDA/PPD and PMDA/(40 mole % PPD: 60 mole % DADE) according to the invention.

Polyamic acid polymer 1A was prepared by reacting 16.13 g of PPD and 43.81 g of BPDA in 341 cc of N,N-dimethylacetamide (DMAC) at ambient temperature to form a 15.8% by weight solids solution having a Brookfield viscosity of 1810 poise.

Polyamic acid polymer 1B was prepared by reacting 18.90 g of DADE, 6.80 g PPD and 34.07 g of PMDA in 341 cc of DMAC to form a 15.7% by weight solids solution having a Brookfield viscosity of 1920 poise.

A polymer blend was formed by mixing 30.0 g of polyamic acid polymer 1A with 45.0 g of polyamic acid polymer 1B and 15 cc DMAC for 20 minutes at ambient temperature. Separate 36.0 g portions of the polymer blend were each mixed with 5 cc of a solution of 28.5 cc of acetic anhydride diluted to 50 cc with DMAC and then with 5 cc of a solution of 29.4 cc of beta-picoline diluted to 50 cc with DMAC. The resulting solutions were centrifuged to remove air bubbles, then cast onto glass plates and converted at room temperature (23° C.). Additional polymer blend solutions were similarly prepared, cast and converted at 40° C., 60° C., 70° C., 80° C., 90° C., 100° C. and 120° C. The blend films were removed from the glass plates as soon as they formed self-supporting gel films. The blend films were then pinned to metal frames and heated at 200° C. for 30 minutes followed by 300° C. for 30 minutes.

The effect of increasing temperatures and rate on the formation of haze and, therefore, phase separation is shown in Table I. The film was progressively less hazy as the temperature increased until the film had no haze at 70° C. and above. The increasing temperature increased the rate and extent of imidization of the gel film and kept the blend polymers from separating out of solution and forming a haze.

TABLE I

| Temperature (° C.) | Haze |
| --- | --- |
| 23 | Hazy |
| 40 | Somewhat Hazy |
| 60 | Slightly Hazy |
| 70 | Not Hazy |
| 80 | Not Hazy |
| 90 | Not Hazy |
| 100 | Not Hazy |
| 120 | Not Hazy |

EXAMPLE 2

Polymer 2A was prepared by reacting 16.13 g of PPD with 43.87 g of BPDA in 341 cc of DMAC to form a 15.8% by weight solids solution having a Brookfield viscosity of 2180 poise.

Polymer 2B was prepared by reacting 18.90 g of DADE, 6.80 g of PPD and 34.51 g PMDA in 341 cc of DMAC to form a 15.8% by weight solids solution having a Brookfield viscosity of 1810 poise.

Polymer 2C was prepared by reacting 31.46 g of PMDA with 28.72 g of DADE in 341 cc of DMAC to form a 15.8% by weight solids solution having a Brookfield viscosity of 2140 poise.

Polymer blends were formed by mixing polyamic acid polymer 2A with either polyamic acid polymer 2B or polyamic acid polymer 2C at ambient temperature for 15 minutes. The blend was cast onto a glass plate using a 35 mil gap bar and the plate immersed in a bath containing 25% by volume of beta-picoline, 25% by volume of acetic anhydride and 50% by volume of DMAC.

The blend was converted into a gel film in the bath, the film was removed from the bath, pinned to a frame and heated successively at 200° C. for 30 minutes, then at 300° C. for 15 minutes and finally at 400° C. for 10 minutes.

Blends were made at 10%, 20%, 30% and 40% by weight of polymer 2A (BPDA/PPD) with polymer 2C (PMDA/DADE) and at 10%, 20%, 30% and 40% by weight of polymer 2A (BPDA/PPD) with polymer 2B (PMDA/DADE:PPD). The modulus and the thermal expansion coefficient (CTE) were measured for each blend film and are summarized in Table II.

TABLE II

| Weight % of Polymer in Blend | | | | |
| --- | --- | --- | --- | --- |
| Polymer 2A (BPDA/ PPD) | Polymer 2B (PMDA/ DADE:PPD) | Polymer 2C (PMDA/ DADE) | Modulus (Kpsi) | CTE (ppm/° C.) |
| 10 | 90 | — | 660 | 32 |
| 20 | 80 | — | 710 | 21 |
| 30 | 70 | — | 750 | 17 |
| 40 | 60 | — | 810 | 15 |
| 10 | — | 90 | 480 | 41 |
| 20 | — | 80 | 490 | — |
| 30 | — | 70 | 610 | 24 |
| 40 | — | 60 | 650 | 21 |

The modulus was much higher and the CTE was lower for polymer blends of BPDA/PPD and PMDA/DADE:PPD according to the present invention compared to the same weight % of polymer blends of BPDA/PPD and PMDA/DADE which do not form part of the present invention.

EXAMPLE 3

A first polymer of BPDA and PPD was prepared in DMAC having a 19.8% by weight solids content and a Brookfield viscosity of 400 poise.

A second polymer of PMDA/(40 mole % PPD: 60 mole % DADE) was prepared in DMAC having a 20.0% by weight solids content and a Brookfield viscosity of 3900 poise.

The polymers were simultaneously fed to a mixer at a rate of 9.2 pph for the first polymer and 13.8 pph for the second polymer (total 23 pph) and mixed with a conversion system of 19 cc per minute of acetic anhydride and 17 cc per minute of beta-picoline. The polymer blend was cast onto a hot drum where it was converted to a gel film. The gel film was stripped from the drum and heated in a tenter frame at an air temperature of 261° C. for 1.8 minutes and then with radiant heaters at a heater temperature ramped from 463° C. to a maximum of 807° C. over a 40 minute period. The final polyimide blend film had a thickness of 1.7 mils.

For comparison, a copolymer of (40 mole % BPDA: 60 mole % PMDA)/(60 mole % PPD: 40 mole % DADE) was prepared in DMAC having a 17.5% by weight solids content and a Brookfield viscosity of 7100 poise. The copolymer was fed to a mixer at a rate of 23 pph and mixed with a conversion system of 20 cc per minute of acetic anhydride and 20 cc per minute of beta-picoline. The mixture was cast onto the surface of a heated drum and converted into a gel film. The gel film was stripped from the drum and heated in a tenter frame at an air temperature of 261° C. for 2 minutes and with radiant heaters at a heater temperature ramped from 526° C. to a maximum of 776° C. over a period of 4.6 minutes. The film had a final thickness of 1.7 mils.

Both the polyimide copolymer and polyimide blend films had high modulus and low thermal expansion coefficients as shown in Table III, however, the polyimide blend film of Example 3 exhibited substantially no blistering.

TABLE III

| | Polyimide Copolymer | Polyimide Blend |
|---|---|---|
| MD Modulus (Kpsi) | 633 | 825 |
| MD CTE (ppm/° C.) | 12.5 | 9.3 |
| Blisters/10 ft.* | 274 | 0 |

*Number of blisters per 10 foot length of film having a width of approximately 12 inches.

EXAMPLE 4

A first copolymer of 98.7 mole % of BPDA, 1.3 mole % of PMDA and PPD was prepared in DMAC having a 18.9% by weight solids content and a Brookfield viscosity of 1830 poise.

A second copolymer of PMDA, 40 mole % of PPD and 60 mole % of DADE was prepared in DMAC having a 16.4% by weight solids content and a Brookfield viscosity of 3370 poise. The polymers were simultaneously fed to a mixer at a rate of 14 pph for the first copolymer and 21 pph for the second copolymer (total 35 pph) along with a conversion system of 40 cc per minute of acetic anhydride and 30 cc per minute of beta-picoline. The polymer blend was cast onto the surface of a heated drum to form a gel film which was stripped from the drum and continuously fed to a tenter frame where it was heated at an air temperature of 262° C. for 1.2 minutes and then with radiant heaters at a heater temperature ramped from 456° C. to a maximum of 924° C. over a 3.6 minute period. The final polyimide blend film had a thickness of 1.6 mils, an MD modulus of 673 Kpsi and had 287 blisters per 10 ft.

The same comparative copolymer of (40 mole % BPDA: 60 mole % PMDA)/(60 mole % PPD: 40 mole % DADE), prepared in Example 3 above, was fed to a mixer at a rate of 35 pph, instead of 23 pph, and mixed with a conversion system of 44 cc per minute of acetic anhydride and 32 cc per minute of beta-picoline. The mixture was continuously cast onto the surface of a heated drum where it was converted to a gel film. The gel film was stripped from the drum and heated in a tenter frame at an air temperature of 266° C. for 1.6 minutes and then with radiant heaters at a heater temperature ramped from 528° C. to a maximum of 778° C. over a 3.6 minute period. The comparative copolymer film had a thickness of 1.7 mils, an MD modulus of 663 Kpsi and had 6400 blisters per 10 ft.

What is claimed is:

1. An intimate polyimide blend comprising:
   (a) from 25 to 50 weight %, based on the total weight of the blend, of a first polyimide prepared by reacting a dianhydride portion with p-phenylenediamine, wherein the dianhydride portion comprises from 90 to 100 mole % of 3,3',4,4'-biphenyltetracarboxylic dianhydride and from 0 to 10 mole % of pyromellitic dianhydride;
   (b) from 50 to 75 weight %, based on the total weight of the blend, of a second polyimide prepared by reacting a pyromellitic dianhydride with a diamine portion, wherein the diamine portion comprises from 20 to 50 mole % of p-phenylenediamine and from 50 to 80 mole % of diaminodiphenylether.

2. The intimate polyimide blend of claim 1 wherein the first polyimide (a) comprises from 30 to 40% by weight of the blend and the second polyimide (b) comprises from 60 to 70 weight % of the blend.

3. A process for preparing an intimate polyimide blend film comprising the steps of:
   (1) admixing at a temperature below which imidization does not substantially occur and for a time sufficient to form an intimate blend of
      (a) from 25 to 50 weight %, based on the total weight of the polyamic acids, of a first polyamic acid prepared by reacting a dianhydride portion with p-phenylenediamine, wherein the dianhydride portion comprises from 90 to 100 mole % of 3,3',4,4'-biphenyltetracarboxylic dianhydride and from 0 to 10 mole % of pyromellitic dianhydride, and wherein the first polyamic acid is dissolved in a polar organic solvent; and
      (b) from 50 to 75 weight %, based on the total weight of the polyamic acids, of a second polyamic acid prepared by reacting pyromellitic dianhydride with a diamine portion, wherein the diamine portion comprises from 20 to 50 mole % of p-phenylenediamine and from 50 to 80 mole % of diaminodiphenylether, and wherein the second polyamic acid is dissolved in a polar organic solvent;
   (2) mixing the blend of polyamic acid polymers (a) and (b) with conversion chemicals to chemically convert the polyamic acids to polyimides;
   (3) forming a gel film of the blend of the polyamic acid polymers (a) and (b) and the conversion chemicals; and
   (4) heating the polyamic acid polymer blend gel film to a sufficient temperature and for a sufficient time to completely convert the polyamic acids to the polyimides.

4. The process for preparing the intimate polyimide blend film of claim 3 wherein the polar organic solvent is selected from the group consisting of N,N-dimethylacetamide, N,N-diethylacetamide, N,N-dimethylformamide, N,N-diethylformamide, N-methyl-2-pyrrolidone, dimethylsulfoxide, diethylsulfoxide, dimethylsulfone and diethylsulfone.

5. The process for preparing the intimate polyimide blend of claim 3 wherein the first polyamic acid polymer (a) comprises from 30 to 40 weight % of the blend and the second polyamic acid polymer (b) comprises from 60 to 70 weight % of the blend.

6. The process for preparing the intimate polyimide blend film of claim 3 wherein the conversion chemicals comprise tertiary amine catalysts and anhydride dehydrating materials.

7. The process for preparing the intimate polyimide blend film of claim 6 wherein the anhydride dehydrating material comprises a lower fatty acid anhydride.

8. The process for preparing the intimate polyimide blend film of claim 7 wherein the lower fatty acid anhydride comprises acetic anhydride.

9. The process for preparing the intimate polyimide blend of claim 6 wherein the tertiary amine catalyst comprises pyridine or beta-picoline.

10. The process for preparing the intimate polyimide blend of claim 3 wherein the gel film is heated at a temperature of from 200° C. to 450° C. for from 1 to 60 minutes to completely convert the polyamic acids to the polyimides.

11. The process of preparing the intimate polyimide blend of claim 5 wherein the dianhydride portion comprises a 100 mole % of 3,3',4,4'-biphenyltetracarboxylic dianhydride.

12. The process for preparing the intimate polyimide blend of claim 11 wherein the diamine portion comprises from 30 to 40 mole % of p-phenylenediamine and from 60 to 70 mole % of 4,4'-diaminodiphenylether.

13. The intimate polyimide blend of claim 1 wherein the dianhydride portion comprises 100 mole % of 3,3',4,4'-biphenyltetracarboxylic dianhydride.

14. The intimate polyimide blend of claim 13 wherein the diamine portion comprises from 30 to 40 mole % of p-phenylenediamine and from 60 to 70 mole % of diaminodiphenylether.

* * * * *